May 8, 1945.  A. E. REEVES  2,375,690
TRIPOD HEAD
Filed June 11, 1943  2 Sheets-Sheet 1

INVENTOR
Arthur E. Reeves
BY John Flam
ATTORNEY

May 8, 1945.  A. E. REEVES  2,375,690
TRIPOD HEAD
Filed June 11, 1943   2 Sheets-Sheet 2

INVENTOR
Arthur E. Reeves
BY John Flam
ATTORNEY

Patented May 8, 1945

2,375,690

UNITED STATES PATENT OFFICE 2,375,690

TRIPOD HEAD

Arthur E. Reeves, Los Angeles, Calif.

Application June 11, 1943, Serial No. 490,415

7 Claims. (Cl. 248—183)

This invention relates to a tripod head, and, more particularly, to one that is adapted to support a device (such as a camera, or the like) in an adjustable manner.

It has been common to provide a head of this general character that permits a camera, or the like, to have free movement in any direction, so as to follow the object of interest while exposures (either still or motion picture) are made. It has also been common to make it possible to restrain the camera to a "panoram" movement; that is, to angular movement about a fixed, substantially vertical axis.

These effects have, heretofore, been secured by the aid of a universal joint that provides axes of motion that are transverse to each other. A joint of this character is most conveniently mounted on top of a tripod, and the camera is mounted on top of the joint. Such an arrangement renders the assembly somewhat unstable; for, when all the restraints are released, the weight of the camera, or other device supported on the tripod, may easily cause the joint to move the camera downwardly against the tripod.

It is one of the objects of this invention to prevent such instability, and especially by providing a novel form of ball and socket joint.

By placing the center of the joint quite closely below the camera, the structure has much greater stability than other forms of joints, using axes fixed relatively to each other. Nevertheless, such ball and socket joints have not been generally acceptable, for it was difficult to provide partial restraints so as to permit "panoramming" alone.

It is another object of this invention to make it possible to restrain a ball and socket joint at will, for permitting motion of the joint only about an axis that has a predetermined position, as required, for example, for "panoramming."

It is still another object of this invention to make it possible to apply and remove the restraint on the ball and socket joint instantaneously, and without regard to the position of adjustment of the joint. Thus, the camera angle can be tilted either above or below the horizontal, when the restraint for panoramming is applied, and the camera can be panorammed while that camera angle is maintained.

It is still another object of this invention to improve in general the structure of tiltable tripod heads.

This invention possesses many other advantages, and has other objects which may be made more easily apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings:

Figure 1 is an elevation, illustrating a tripod head embodying the invention, shown as mounted on a tripod and as supporting a camera;

Figs. 2, 3, and 4 are sectional views, respectively taken along the correspondingly numbered planes of Fig. 1;

Figure 1:
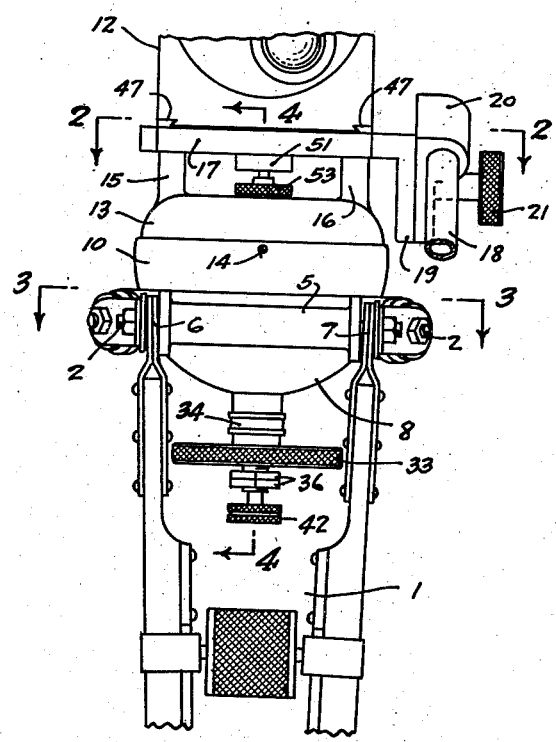
Figure 3:
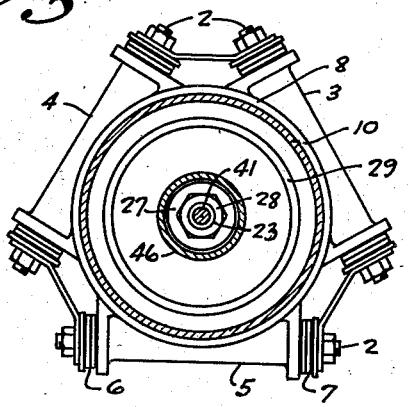
Figure 4:
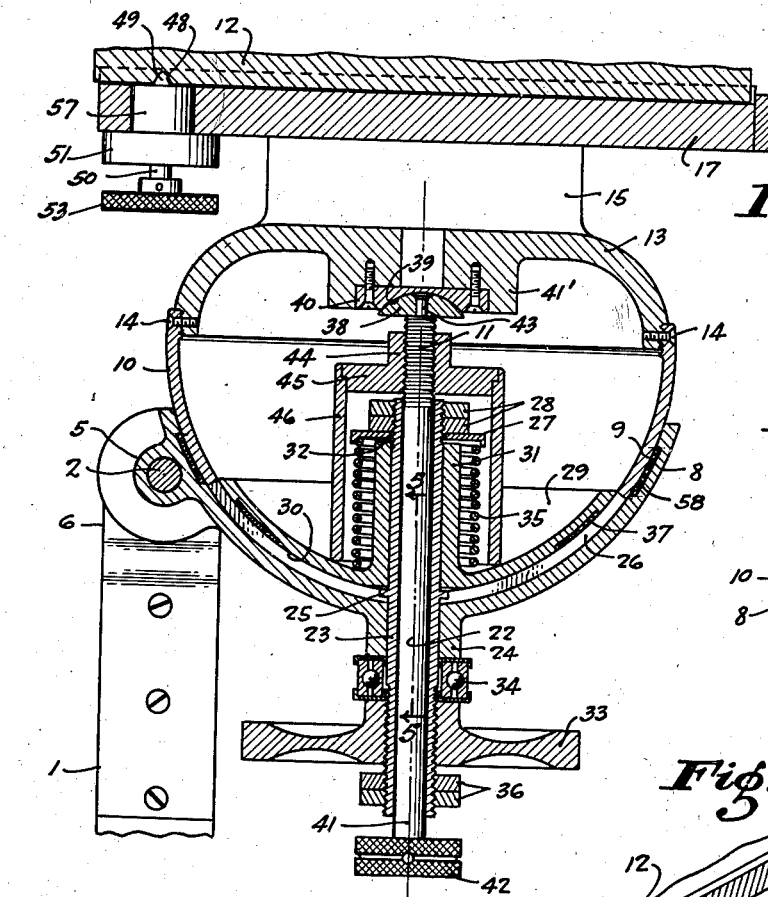

In the present instance, the tripod head is shown as supported upon tripod leg structures 1 (Figs. 1 and 4). Each of these structures, as shown most clearly in Fig. 3, is hinged for movement by the aid of hinge pins 2. These hinge pins are accommodated in the hinge lugs 3, 4, and 5 that are formed integrally with the tripod head. Each of the tripod legs 1 carries at its upper end a pair of ears, such as 6 and 7, accommodated respectively at the ends of the corresponding hinge lug 5, and the corresponding pin 2 passes through these ears.

The particular structure of the tripod legs is of no interest in connection with the present invention. Appropriate mechanism, associated with the hinges, may be utilized for ensuring sufficient frictional restraint at the hinges against spreading of the tripod legs; and a mechanism may also be used for adjusting the length of the legs, and for maintaining such adjustment.

The hinge lugs 3, 4, and 5 are shown as formed integrally with a socket member 8 of the tripod head. This socket member has an interior spherical surface 9 (Fig. 4) with which the hollow ball member 10 cooperates. The center of the cooperating spherical surfaces between the ball member 10 and the socket member 8 is at a point 11, within the space formed by the hollow ball member 10.

The ball member 10 serves as a supporting member for a camera 12. The manner in which this camera 12 is held in place on the tripod head will be described hereinafter. It is sufficient, for the present, to note that the ball member 10 includes a cover 13 (Figs. 1 and 4). This cover 13 is threaded into the upper edge of the ball member 10, and several radially extending fastening screws 14 may be threaded into the cover member 13 and through the upper edge of the ball member 10. The cover 13 carries a pair of parallel supporting standards 15 and 16, to which is fastened a table-like member 17. It is upon this table-like member 17 that camera 12 is disposed.

Universal movement of the ball member 10 in the socket member 8 is provided for by appropriate means that will be described hereinafter. This movement is controlled by the aid of a handle 18. This handle 18 may be inserted into an ear 20 that is shown as supported upon a flange 19 (depending from table 17) by the aid of the thumb screw 21.

Figure 5:
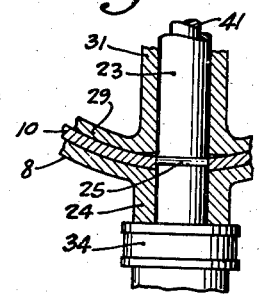
Fig. 5 is an enlarged fragmentary sectional view, taken along plane 5—5 of Fig. 4.
Figure 6:
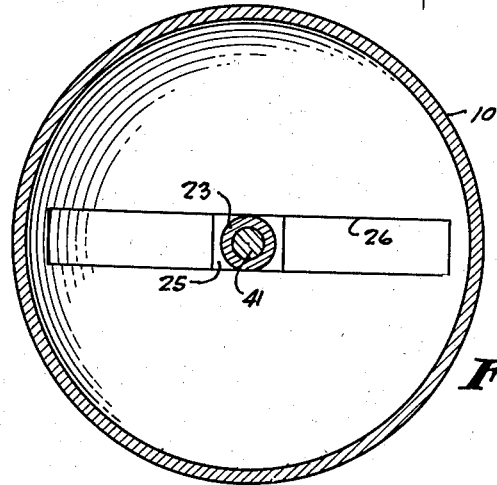
Fig. 6 is a fragmentary sectional view, showing the interior of the ball part of the ball and socket joint.
Figure 7:
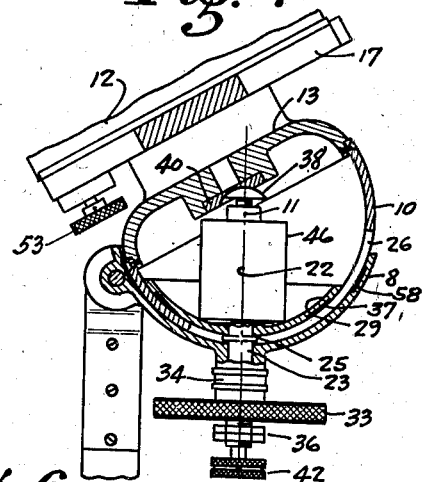
Fig. 7 is a view, partly in section, illustrating an alternative position of the tripod head.

Referring, now, more particularly to Figs. 4, 5, and 6:

By appropriate manipulation of the handle 18, the ball member 10 may be caused to move angularly about an axis 22 of the table, as well as tilted about the center 11. For this purpose, there is provided a post structure. One element of this post structure is in the form of a hollow post 23, having an axis coincident with axis 22, and fixed with respect to the socket member 8. This axis 22 is aligned with the center 11 of the spherical surfaces. Post 23 is guided in the boss 24 extending downwardly from the socket member 8. The boss 24 permits rotation and axial movement of post 23. The post 23 is provided at an intermediate point with a substantially rectangular portion 25. This rectangular portion 25 has a running clearance with a slot 26 formed in the ball member 10. Accordingly, there is a spline connection between the post 23 and the ball member 10. In this way, the ball member 10, if desired, may be tilted, for example, to the position illustrated in Fig. 7, while maintaining the rectangular portion 25 within the slot 26. Any tilted position within limits may thus be obtained. Additionally, the ball member 10 may be angularly moved about the axis 22. In such event, the rectangular portion 25 moves angularly in conformity with the movement of the ball member 10, and post 23 is angularly rotated within the boss 24.

Accordingly, a guided universal movement may be imparted to the ball member 10.

Means are provided to make it possible to clamp the ball member 10 in the socket member 8 at any adjusted position. For this purpose a clamping member 29 is provided. This clamping member has a spherical or ball surface 30 cooperating with the interior spherical surface of the ball member 10. Obviously, a force of compression, if sufficiently great, exerted between socket member 8 and the clamp 29 will hold the ball member 10 frictionally and will restrain the ball member 10 from any movement whatever. This frictional force can be exerted by axial movement of the post 23.

For this purpose the clamp 29 is provided with a hub 31 in which the post 23 has a sliding fit. The upper surface 32 of this hub is adapted to be urged downwardly by operation of the post 23, so as to create a clamping force upon the ball member 10. In order to exert this downward force, the post 23 carries a flange 27. This flange 27 is restrained against upward movement with respect to the post 23 by the aid of the nuts 28 that are threaded on the upper extremity of the post 23. Axial movement of the post 23 downwardly thus brings the lower surface of the flange 27 into contact with the surface 32 of the boss 31, and a clamping effect is thereby produced.

The rectangular portion 25 of post 23 is appropriately made thin enough so that it will not be moved out of the slot 26 upon clamping and releasing axial movement of the post 23.

Axial movement of the post 23 may be accomplished by manipulation of a knurled handle member 33. This handle member 33 is in the form of a hand wheel internally threaded and engaging the external threads at the lower extremity of the post 23. Between the hand wheel 33 and boss 24 is an anti-friction bearing structure 34. A resilient force is provided constantly urging the post 23 upwardly so that hand wheel 33 must be operated to urge the lower surface of flange 29 against surface 32. Upward movement of post 23 is limited by the upper surface of bearing structure 34 that engages boss 24. The resilient force is provided by a compression spring 35 disposed around boss 31. The upper end of this spring 35 is in engagement with the lower surface of the flange 27.

The spring 35 not only acts to urge the post 23 upwardly, but it also provides a resilient force urging the clamp 29 downwardly. This resilient force may be so chosen that the ball member 10, with the attached camera 12, may be moved to any adjusted position and temporarily retained in that position in a stable manner. However, by turning hand wheel 33, the post 23 can be lowered, compressing the spring 35 and finally causing contact to be made between flange 27 and the upper surface 32 of boss 31. When this occurs, as heretofore stated, a much stronger frictional force is imposed upon the ball member 10 by the clamp 29, and the member 10 is restrained against any movement in the socket member 8.

The spring force 35 may be adjusted to some extent by appropriate adjustment of the nuts 28. Furthermore, nuts 36 may be provided at the lower extremity of the post 23 to provide a limit to the upward movement of the post 23. This limit is imposed by contact of the upper surface of the upper nut 36 with the lower surface of the wheel 33.

Since post 23 is keyed or splined by the aid of the slot 26 to the ball member 10, rotation of the wheel 33 can result only in axial movement of the post 23, without rotation thereof.

From the foregoing it is clear that the ball member 10 can be tilted in either direction within the limits provided by the slot 26, and it may be clamped in any tilted position by operation of the hand wheel 33. Panoramming movement of the ball member 10 is permitted, while the clamp is released, by angular movement of the ball member 10 about the axis 22, effected by operation of handle 18. Such angular movement causes rotation of the post 23.

In order to prevent binding between the spherical surfaces, it is preferable to provide annular felt pads 37 and 58 in shallow recesses respectively formed in the clamping member 29 and socket 8. These pads bear all of the pressure between the co-operating parts 8, 10, and 29; they also prevent ingress of foreign matter between the adjacent surfaces of the clamp 29, ball member 10, and socket 8.

Since there are large surfaces of contact between the pad 37 and ball member 10, as well as between pad 58 and ball member 10, the weight of the camera 12 is ineffective to overcome the friction between these surfaces, even when only the spring 35 is active to create that force.

It is advantageous to restrain the ball member 10 to angular movement only about the axis 22. Such a restraint can be imposed upon the ball member 10 by another portion of the post structure. This restraint includes a spherical member 38 (Figs. 4 and 7) which may be utilized to co-operate with a corresponding concave spherical surface 39 carried by the cover 13. This spherical surface 39, centered on the point 11, is shown as formed in a seat member 40 fastened to the inner side of the boss 41', depending from cover 13.

The spherical member 38 may be used to restrain tilting movement of the ball member 10 with respect to the post 23. This can be accomplished by the aid of a screw 41 having a knurled head 42 and extending through the post 23. The upper end of this screw 41 is shown as provided with a post 43 that is accommodated in the spherical member 38. Upward axial movement of the screw 41 (by mechanism hereinafter described) clamps the spherical member 38 into the inner interior spherical surface 39. This clamping action may be accomplished irrespective of the tilted position of the ball member 10, for example, to the position illustrated in Fig. 7. When the spherical member 38 is thus clamped, there is a strong frictional restraint against tilting movement of the ball member 10. There is, however, no such restraint against angular movement of the ball member 10 about the fixed axis 22; in other words, panoramming is thus permitted while tilting is prevented. Since screw 41 is then firmly coupled to ball 10 through the tight engagement of member 38 in surface 39, this screw 41 turns freely within the post 23 during panoramming.

The screw 41 is caused to move axially by rotation in the boss 44 of a flange 45. This flange 45 is disposed above the nut 28. It carries a tubular member 46. The lower edge of this tubular member 46 is in frictional engagement with the interior surface of the clamp 29. This frictional engagement is sufficient to restrain rotation of the flange 45 when screw 41 is rotated.

When the spherical member 38 is thus urged strongly by screw 41 into position against the spherical surface 39, the tubular member 46 is correspondingly urged downwardly strongly into contact with the clamp 29. The screw 41 may thus be operated to advance or retract the spherical member 38. Correspondingly, the ball member 10 is retrained to panoramming movement or is left unrestrained, except as it may be retrained by clamp 29.

When restrained for panoramming, the ball member 10, cover 13, tubular member 46, clamping member 29, and screw 41 rotate as a unit. Socket 8 and clamp 29 in this condition exert no strong restraint upon the ball member 10. The sole restraint is that effected by compression spring 35.

Manipulation of the device to clamp and unclamp the ball member 10 is simple. To hold the camera 12 in any adjusted position, the hand wheel 33 is rotated to operate clamp 29. If it is desired merely to panoram the camera, the hand wheel 33 is operated to release the clamp 29, and the knurled head 42 of the screw 41 is rotated to urge spherical member 38 into strong frictional engagement with the interior spherical surface 39.

Figure 2:
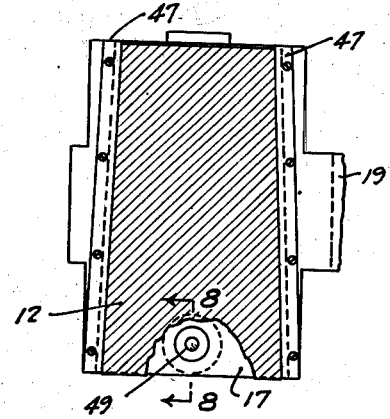
Figure 8:
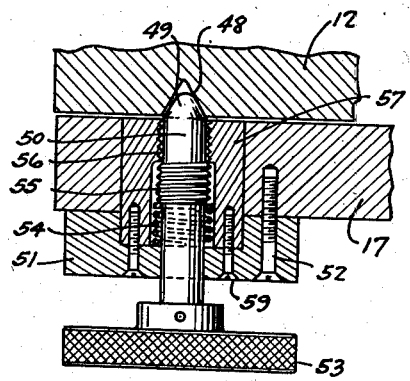
Fig. 8 is an enlarged sectional view, taken along plane 8—8 of Fig. 2.

The camera 12 may be supported on a table-like member 17 in a manner disclosed most clearly in Figs. 1, 2, and 8. This table-like member 17 is shown as provided with converging guide flanges 47 on the upper surface. These flanges have overhanging upper edges forming a dovetail slot into which the lower surfaces of the camera 12 can slide. For this purpose, this lower surface of the camera is provided with a correspondingly converging mating portion adapted to fit snugly into the dovetail slot.

Upon movement of the camera to the left, as viewed in Fig. 4, or downward movement of the camera 12, as viewed in Fig. 2, the interlocking of the camera with the flanges 47 may be freed and the camera may be lifted off the table 17. Conversely, the camera 12 may be lowered onto the table-like member 17 and then moved toward the right (as viewed in Fig. 4), or upwardly (as viewed in Fig. 2), until the flanges 47 are in complete engagement with the lower portion of the camera 12.

It may be desirable to lock the camera 12 to the table 17. A locking device is provided for this purpose. The structure of this locking device is shown most clearly in Fig. 8.

A tapered recess 48 is provided in the bottom of the camera 12. This recess is in such position that, when the camera 12 is in complete engagement with the flanges 47, the tapered end 49 of a post 50 can enter into the aperture. This post 50 is shown as guided in a guiding member 51, attached as by screws 52 to the bottom of the table-like member 17. The lower end of the post 50 is provided with a knurled handle 53. The post 50 is arranged to be resiliently urged upwardly into recess 48. Accordingly, as the camera 12 slides on table 17 toward fully engaging position, the post 50 is depressed by the lower surface of the camera. It snaps into the position of Fig. 8 when the camera 12 has reached the end of its movement with respect to table 17.

The resilient force operating on post 50 is provided by a compression spring 54. This spring surrounds the shank of post 50. Its lower end is in contact with the inner surface of the guide 51. Its upper end engages below the threaded portion 55 of the post 50. The upper end of threaded portion 55 is thus urged by the spring 54 upwardly against the threaded portion 56 of a nut member 57. This nut member 57 is telescoped into a recess in the guide 51, and is fastened thereto by the aid of the screws 59.

By rotation of the handle 53, the threaded portion 55 may be threaded into the nut 57, and thereby a positive lock for the camera 12 may be provided, in addition to the resilient lock provided by the spring 54. The tapered surface of the point 49 co-operates with the tapered recess 48 in such manner that the resilient force of the spring 54 constantly urges the camera toward the right, as viewed in Figs. 4 and 8.

The inventor claims:

1. In an adjustable support for cameras, or the like, means forming a concave socket, a supporting member having a surface co-operating with the socket and movable therein, means for clamping said member against any movement with respect to the socket, and means for confining said member for angular movement about an axis fixed with respect to the socket.

2. In an adjustable support for cameras, or the like, means forming a spherical socket, a supporting member having a spherical surface cooperating with the socket, a rotary post having an axis fixed with respect to the socket, and alined with the center of the spherical surface, a clamp optionally restraining said member against any movement relative to the socket, and means movable axially of said post and co-operating with said member to confine said member to angular movement about the axis of the post.

3. In an adjustable support for cameras, or the like, means forming a spherical socket, a supporting member having a spherical surface cooperating with the socket, a rotary post having an axis fixed with respect to the socket, and alined with the center of the spherical surface, a clamp for restraining the supporting member against any movement with respect to the socket, means carried by the post and operating by rotation of the post to urge the clamp into clamping position, and independently operable means for coupling said member and post so as to confine movement of the member to angular movement about the said axis.

4. In an adjustable support for cameras, or the like, means forming a spherical socket, a supporting member having a spherical surface cooperating with the socket, a rotary post having an axis fixed with respect to the socket, and alined with the center of the spherical surface, a clamp for restraining the supporting member against any movement with respect to the socket, means carried by the post and operating by rotation of the post to urge the clamp into clamping position, and independently operable means for coupling said member and post so as to confine movement of the member to angular movement about the said axis, comprising a screw coaxial with the post, and a restraint carried by the end of the screw and engaging the supporting member.

5. In a tiltable support for cameras, or the like, having a ball and socket mechanism to permit universal movement of the support, the combination therewith of a screw having an axis alined with the center of the ball and socket, and movable axially when rotated, and a restraining means operated by said screw and cooperating to limit movement of the mechanism only to angular movement about an axis fixed with respect to the socket.

6. In an adjustable support for cameras, or the like, a pair of parts forming a ball and socket mechanism, the ball part having provisions for supporting a camera, or the like, and a composite post structure having an axis fixed with respect to the socket part, and alined with the center of the mechanism, one part of the post structure being operable to clamp the ball and socket parts against any relative movement, and another part of the post structure being independently operable to restrain movement of the ball part angularly about said axis.

7. In an adjustable support for cameras, or the like, a pair of parts forming a ball and socket mechanism, the ball part having provisions for supporting a camera, or the like, a clamp having a spherical surface co-operating with a corresponding internal spherical surface of the ball part, means extending into the ball part and having an axis fixed with respect to the socket part, for operating said clamp, said ball part and said means being connected so that rotation of the ball part causes rotation of the said means, and said ball part having a slot permitting tilting thereof, and means for holding said ball part in any tilted position with respect to the clamp operating means, for restraining movement of the ball part to angular motion about said fixed axis.

ARTHUR E. REEVES.